July 20, 1926. Re. 16,390

A. S. SPEER

ROOFING UNIT

Original Filed April 7, 1919

Witness:
Harry S. Gaither

Inventor:
Alexander S. Speer
by Emery, Booth, Janney & Varney
Attys

Reissued July 20, 1926. Re. 16,390

UNITED STATES PATENT OFFICE.

ALEXANDER S. SPEER, OF BUFFALO, NEW YORK, ASSIGNOR, BY MESNE ASSIGNMENTS, TO CENTRAL TRUST COMPANY OF ILLINOIS, A CORPORATION OF ILLINOIS, AND AKSEL K. BODHOLDT, OF EVANSTON, ILLINOIS.

ROOFING UNIT.

Original No. 1,318,238, dated October 7, 1919, Serial No. 288,035, filed April 7, 1919. Application for reissue filed October 5, 1921. Serial No. 505,634.

This invention relates to roofing units, for covering roofs or the like, made of sheet roofing material, which, when laid, present the appearance of shingles.

Among other objects, the invention is intended to provide a novel and improved roofing unit, which, when laid on a roof, will produce a pleasing appearance.

A further object is to provide a roofing unit in which the liability of leakage is minimized.

Another object is to provide a roofing unit of this type economically from sheet roofing material with a minimum of waste.

The invention consists of the novel constructions, arrangements, and combinations, to be hereinafter described and claimed, for carrying out the above stated objects and such other objects as will appear from the following description.

The invention is illustrated in certain embodiments in the accompanying drawing in which.

Like characters of reference designate like parts in the several figures of the drawing.

Figure 1:
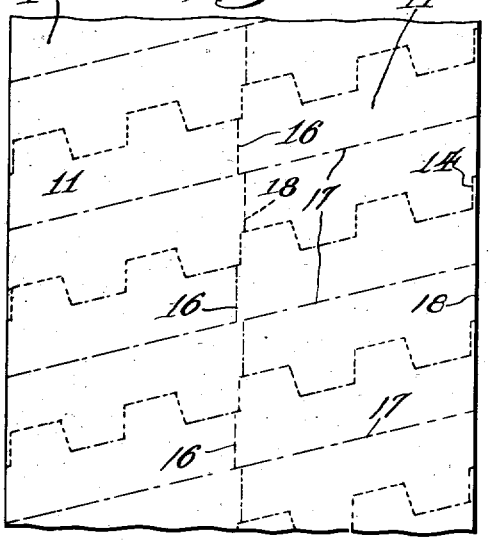
Figure 1 is a plan view of a sheet of roofing material in which the lines, along which the various shingle units are severed, are indicated by dotted lines.

In the drawing 10 designates a sheet of roofing material of limited width from which the roofing units hereinafter described are adapted to be cut. The individual roofing units comprise a body or strip 11 formed along one edge with a shingle tab or projection 12 of semi-hexagonal shape. The lower end 13 of the shingle tab is considerably longer than the sides 14. Adjacent the tab is a recess 15 which corresponds exactly in size and shape to the shingle tab, but reversed in position. The illustration unit 11 comprises a pair of shingle tabs having recesses or spaces 15 between them.

It will be noted from Figure 1 that the shingle tabs along the edge of one unit are complementary to the spaces or recesses of the adjacent unit and, therefore, the spaces between adjacent tabs in each unit are in effect complementary to such tabs. In other words, the material occupying the spaces or recesses on one unit form the shingle tabs on the adjacent unit. Thus the shingle units may be cut without substantial waste of material. If desired, as illustrated in Figure 1, a sheet of material 10 wide enough to form a pair of units 11 may be employed. The sheet is then severed along the lines 16 to divide the strip cut from the sheet into two units. Preferably, the lines 16 along which the units are severed are offset slightly so as not to be extensions of the side of the corresponding shingle tab. Between each pair of units, the sheet is severed along the straight line 17 as shown in Figure 1.

As shown in Figure 1 the various units are cut diagonally of or on the bias of the sheet 10 with one side 14 of a shingle tab parallel and substantially coinciding with one edge of the sheet 10. This arrangement not only saves material in cutting the roofing unit having semihexagonal tabs but also provides a unit having ends 18 inclined to the general direction of the length of the unit for the purpose of providing joints 19 between adjacent units which are not at right angles to the courses of units when laid in the roof. Preferably the units are made with an equal number of tabs and spaces or recesses, so that when laid in courses with the ends at one unit abutting the ends of adjacent units, the tabs will be separated by equal spaces. Preferably the width or depth of the unit 11 is considerably greater than the depth of the shingle tab so that when laid in a roof a greater number of thicknesses of roofing material will be provided. In the illustrative shingle unit, the depth of the body of the strip is substantially twice the depth of the shingle tab and thus provides a roofing which is covered by at least two thicknesses of roofing material at every point.

Figure 2:
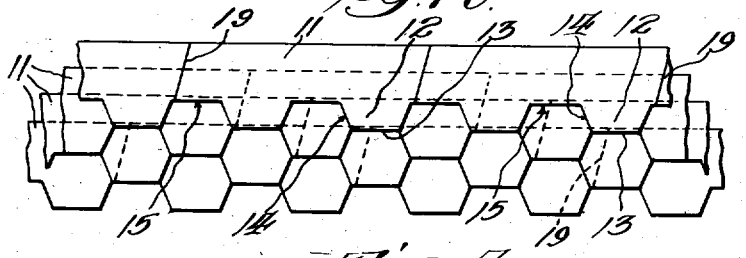
Figure 2 is a plan view illustrating the appearance of a roofing surface when laid with the shingle units illustrated in Figure 1.

As illustrated in Figure 2, the units are adapted to be laid on a roof in courses with the ends of the tabs of one course coinciding with the bases of the recesses or spaces between adjacent tabs of the next lower course of units, thus presenting the appearance of courses of conventional hexagonal shingles. The oblique lines of juncture 19 between adjacent units in each course are covered by intact portions of the units of both of the overlying courses.

Figure 3:
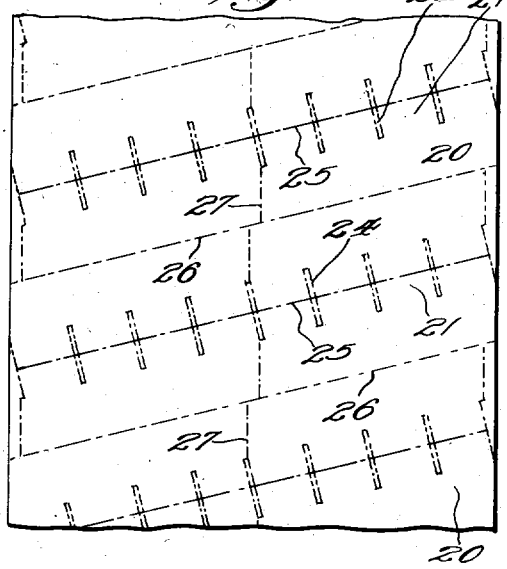
Figure 3 is an illustration of the manner of cutting a different form of roofing unit from a sheet of roofing material so as to embody certain features of the invention.

In Figure 3 is illustrated the manner of cutting a different form of shingle unit, bias of the sheet of material. The units 20 have rectangular-shaped tabs with narrow spaces 22 between them. The ends 23 of the units 20 are inclined to the front edge of the unit. As shown in Figure 3 the sheet of roofing material is made wide enough to form two units, cut from the material side by side. These units are formed by cutting a series of equally spaced slots 24 in the material to provide the spaces 22 in the units and by severing the sheet along the lines 25 and 26 bias to the sheet. The diagonal strips are severed along the staggered lines 27 to divide each transverse strip into a pair of units.

Figure 4:
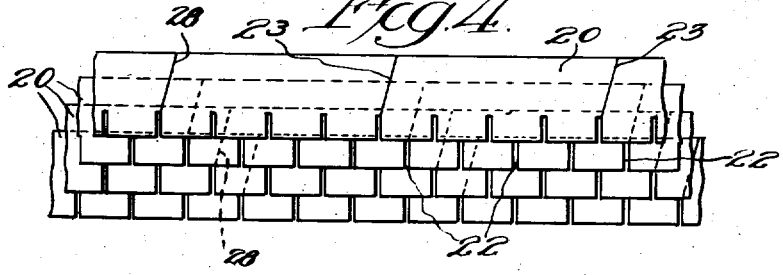
Figure 4 illustrates the appearance of roofing when laid with the roofing unit illustrated in Figure 3.

In Figure 4 is illustrated the appearance of a roof covering employing the units 20. It will be noted that the units 20 are so cut from the sheet that the ends of the unit lie at a space or notch 22. The oblique lines of juncture 28 between adjacent units of each course are covered by intact portions of the units of both of the overlying courses. This result is effected by staggering the notches or spaces 22 between the tabs in adjacent courses.

I claim:

1. A shingle unit, or strip, adapted to be laid end to end in a roof to form a course and to have similar courses superimposed thereupon, said unit having along one edge a plurality of projections and spaces, said projections simulating a plurality of individual shingles when the unit is laid in a roof, and a body portion of greater width than the projections, the end edges of said body portion being disposed at other than a right angle to the general line of the front edge of the unit.

2. A shingle unit, or strip, adapted to be laid end to end in a roof to form a course and to have similar courses superimposed thereupon, said unit having along one edge a plurality of projections and spaces, said projections simulating a plurality of individual shingles when the unit is laid in a roof, and a body portion of greater width than the projections, the end edges of said body portion being disposed at an obtuse angle to the general line of the front edge of the unit.

3. A shingle unit, or strip, adapted to be laid end to end in a roof to form a course and to have similar courses superimposed thereupon, said unit comprising a body portion having along one edge a plurality of projections and spaces, said projections simulating a plurality of individual shingles when the unit is laid in a roof, the end edges of said body portion being disposed at other than a right angle to the general line of the front edge of the unit.

4. A shingle unit or strip formed from a sheet of roofing material and having along an edge a plurality of projections and spaces, said projections cooperating to simulate a plurality of individual shingles when the unit is laid in a roof, the end edges of said strip being inclined to the general line of the front edge of the unit.

5. A shingle unit comprising a strip of composite roofing material having projecting from one edge a plurality of spaced, tapering tabs, the spaces between said tabs being complementary in shape to said tabs, the end edges of said unit being oblique to the general line of the front edge of said unit, said units adapted to be laid in courses with the ends of the units abutting in inclined lines of juncture and with the ends of the tabs of one course coinciding with the upper edges of the spaces in the next lower course, thereby presenting the appearance of hexagonal shingles, each tab so proportioned that the horizontal edge thereof predominates in length over the horizontal projection of the sides of said tabs.

6. A shingle unit formed from sheet roofing material, comprising a body portion having a tapered shingle tab, narrower at its free end, projecting transversely from the body portion; the end of said shingle tab being parallel with the front edge of the body portion and said tab being spaced from one end of the body portion a distance equal to the length of the end of said tab; the side edges of the tab being at such an inclination to the end edge that the aggregate of their projections upon the line of the end tab-edge is not longer than the length of the end edge of the tab.

7. A shingle unit formed from a sheet of flexible roofing material comprising in combination an elongated strip having parallel sides and constructed and arranged to be laid with similar units in overlapping courses in a roof with a long side of said strip lying longitudinally of the course and constituting the exposed edge of the unit, thereby presenting the appearance of a shingled surface; said unit being cut from said sheet of roofing on the bias whereby the ends of said unit are inclined to the longitudinal edge thereof and the joint between adjacent units in a course lies obliquely of the course.

ALEXANDER S. SPEER.